United States Patent [19]
Amatsutsu et al.

[11] Patent Number: 5,832,960
[45] Date of Patent: Nov. 10, 1998

[54] WIRE HARNESS PROTECTOR

[75] Inventors: Hiroyuki Amatsutsu; Yasuhiro Kikumori, both of Osaka, Japan

[73] Assignee: Totaku Industries, Inc., Osaka, Japan

[21] Appl. No.: 838,537

[22] Filed: Apr. 9, 1997

[30] Foreign Application Priority Data

Apr. 10, 1996 [JP] Japan ................................. 8-114171

[51] Int. Cl.⁶ .............................. F16L 9/00; F16L 11/00
[52] U.S. Cl. ..................... 138/110; 138/128; 138/156; 138/155; 138/121
[58] Field of Search .................... 138/121, 122, 138/156, 110, 103, 148, 128

[56] References Cited

U.S. PATENT DOCUMENTS

| | | | |
|---|---|---|---|
| 2,146,352 | 2/1939 | Rohrer | 138/155 X |
| 2,206,286 | 7/1940 | Karmazin | 138/155 X |
| 3,693,664 | 9/1972 | Schmunk | 138/155 X |
| 4,275,771 | 6/1981 | Campbell, Jr. | 138/155 X |
| 4,560,320 | 12/1985 | Baus | 138/155 X |
| 4,662,734 | 5/1987 | Nishi | 138/121 |
| 4,790,975 | 12/1988 | Jarvenkyla et al. | 138/121 X |
| 5,429,397 | 7/1995 | Kano | 138/121 X |

FOREIGN PATENT DOCUMENTS 6-276643  9/1994  Japan .

*Primary Examiner*—Patrick F. Brinson
*Attorney, Agent, or Firm*—Whitham, Curtis & Whitham

[57] ABSTRACT

In a wire harness protector, a pipe wall has a structure in which wall portions rectangular in section and wall portions circular in section are disposed alternately in the longitudinal direction, a cutting line used for insertion of the wire harness and passing substantially centers of flat sides of the sectionally rectangular wall portions is formed over the entire length of the pipe wall, and the whole of pipe wall is formed of synthetic resin or rubber.

19 Claims, 5 Drawing Sheets

WIRE HARNESS PROTECTOR

BACKGROUND OF THE INVENTION

The present invention relates to a wire harness cladding protector used for enclosing a vehicle wire harness in the inside thereof and for protecting the same.

Conventionally, a protector for cladding a wire harness has had such a structure that a cutting line for inserting a wire harness is provided in the form of a straight line along the axial direction in a flexible pipe shaped into a simple circular tube, or that a cutting line for inserting a wire harness is provided in the form of a straight line along the axial direction in a bellows-like pipe formed into an annular corrugated shape (for example, see Japanese Patent Unexamined Publication No. Hei 6-276643).

Therefore, any conventional protector for cladding a wire harness, which is cylindrical, has had such problems that the protector is apt to be rotated or twisted in its circumferential direction in the piping and wiring posture of the protector in which a wire harness is inserted, and it is difficult to stably keep the cutting line for inserting a wire harness in a predetermined position, and that it is difficult to provide the cutting line for inserting a wire harness in the form of a straight line along the axial direction of the protector, because the protector is cylindrical.

SUMMARY OF THE INVENTION

It is therefore an object of the present invention to solve the foregoing problems belonging to such a conventional wire harness protector, and to provide a wire harness protector having a special structure in which the protector can be subjected to piping and kept stably in a predetermined posture with less twist phenomenon though the protector has flexibility as a whole so that any portion of the protector can be bent easily, the cutting line can be kept in a predetermined position, the cutting line can be easily formed in a straight line along the axial direction of the protector, and the protector can be easily produced in the same manner as a conventional wire harness with no increase in cost.

In order to solve the above problems, according to the present invention, there is provided a protector for a wire harness wherein a pipe wall has a structure in which wall portions rectangular in section and wall portions circular in section are disposed alternately in the longitudinal direction, a cutting line passing substantially centers of flat sides of said sectionally rectangular wall portions is formed over the entire length of said pipe wall, and the whole of said pipe wall is formed of synthetic resin or rubber.

To carry out the present invention, the pipe wall may have a structure in which, in the inner circumferential surface, the sectionally circular wall portions project toward the inside more than the center portions of the flat sides of the sectionally rectangular wall portions, or such a structure in which the center portions of the flat sides of the sectionally rectangular wall portions and the sectionally circular wall portions are formed to be substantially even in surface to each other, or such a structure in which, in the outer circumferential surface, the sectionally circular wall portions sink toward the inside more than the center portions of the flat sides of the sectionally rectangular wall portions, and the width of each of the sectionally rectangular wall portions in its axial direction is formed to be substantially equal to or smaller than the width of each of the sectionally circular wall portions in its axial direction.

The sectional shape of the sectionally rectangular wall portions described herein is not limited to a square, but it may be carried out as a rectangle. In addition, each of the sectionally rectangular wall portions can be carried out such that protrusions . . . having a desired size may be formed to project over the outer circumferential surface while recesses . . . fitting to the protrusions be formed in a side different from this projecting surface.

As the material for forming the protector for wire harness according to the present invention, polyethylene, polyvinyl chloride, polypropylene, any other synthetic resin material, natural rubber, synthetic rubber or any other rubber material, or mixture of those material with reinforcing material or heat-resistant material such as carbon fibers, glass fibers or the like, can be used.

DETAILED DESCRIPTION OF THE INVENTION

Figure 1:
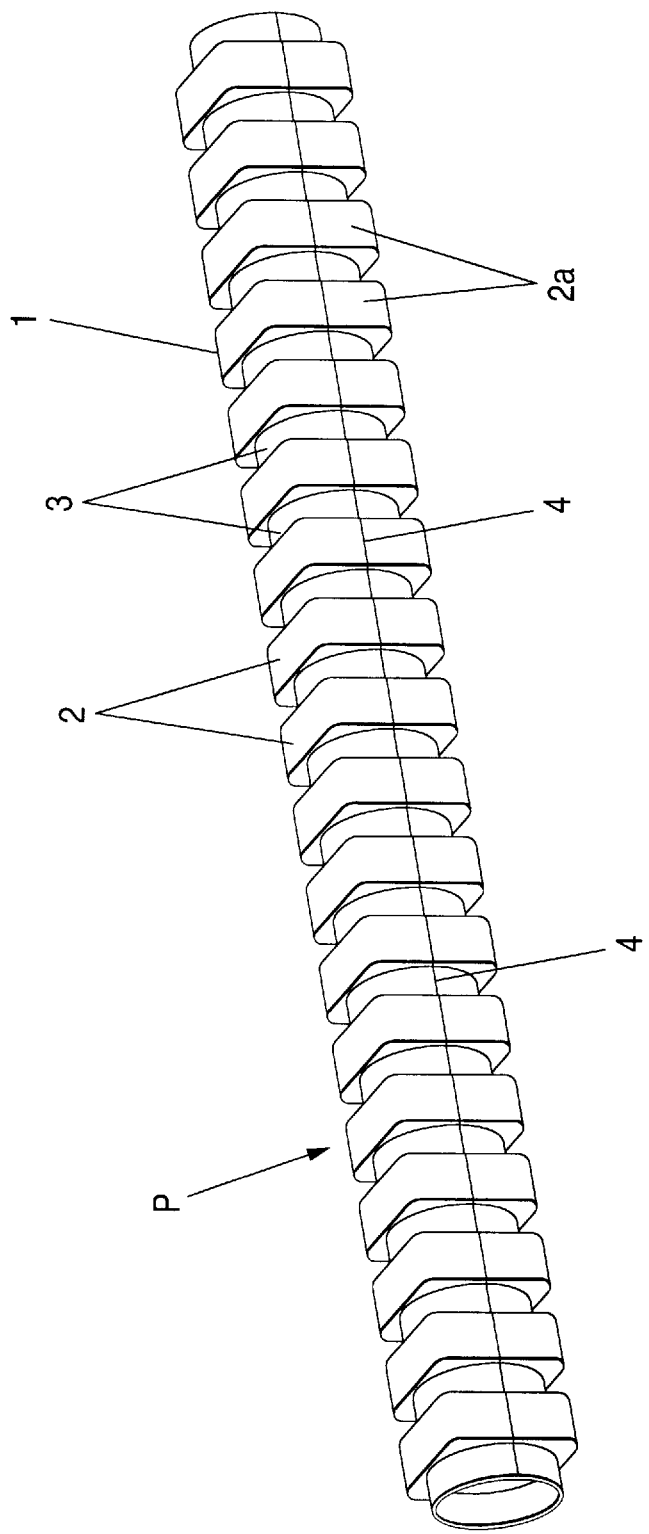
FIG. 1 is a perspective view showing a protector of a first embodiment.
Figure 2:
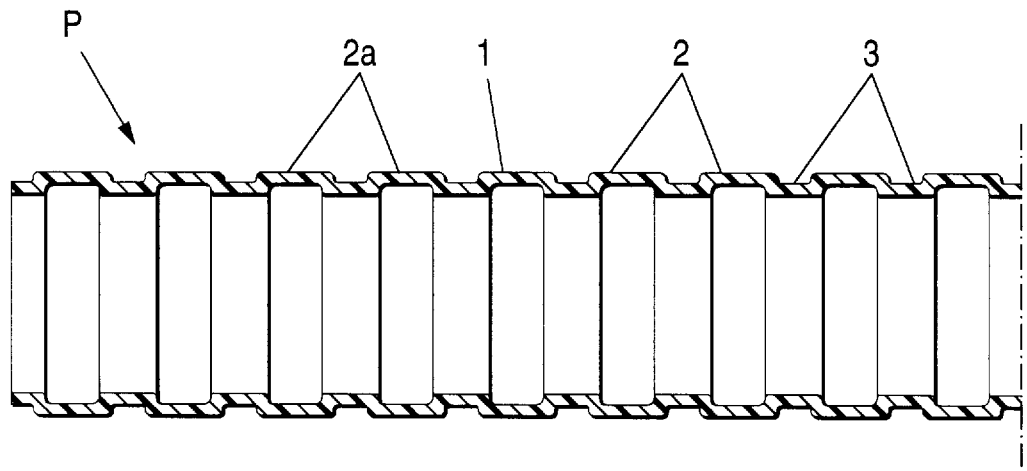
FIG. 2 is a vertical sectional view of the protector of FIG. 1 along its longitudinal direction.
Figure 3:
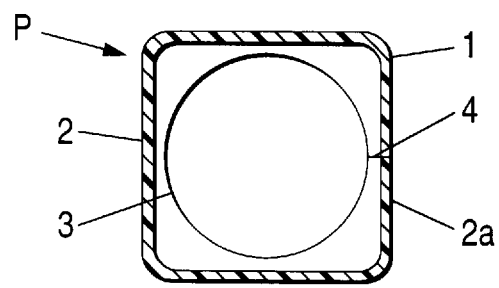
FIG. 3 is a vertical sectional view of a sectionally rectangular wall portion of the protector of FIG. 1.
Figure 4:
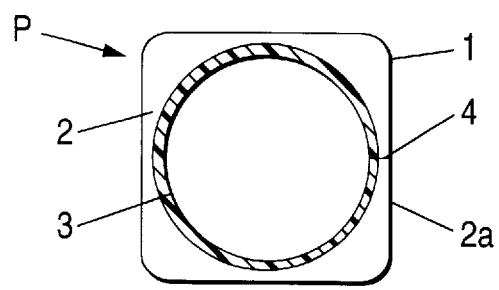
FIG. 4 is a vertical sectional view of a sectionally circular wall portion of the protector of FIG. 1.

Preferred embodiments of the present invention will next be described with reference to the accompanying drawings. FIGS. 1 to 4 are views showing a pipe of a first embodiment. FIG. 1 is a perspective view showing the appearance of a protector P, FIG. 2 shows a shape in which a pipe wall is cut in the longitudinal direction of the pipe, FIG. 3 shows a shape in which a sectionally rectangular wall portion 2 of the pipe wall is cut, and FIG. 4 shows a shape in which a sectionally circular wall portion of the pipe wall is cut.

A protector P shown in this embodiment, as shown in these drawings, has a structure in which a pipe wall 1 is formed to be a bellows-like corrugated shape in the axial direction of the pipe, each of the sectionally rectangular wall portions 2 of this corrugated shape has a sectional shape which is made to be a square having rounded corners, the sectional shape of each of the sectionally circular wall portions 3 of this corrugated shape is made circular, and those two-type wall portions 2 and 3 are formed continuously and alternately, and a cutting line 4 for inserting a wire harness is formed to pass substantially the centers of flat sides 2a of the sectionally rectangular wall portions 2 over the entire length of the protector P. In addition, as is apparent particularly from FIG. 2, this protector P has a structure in which its inner circumferential surface is formed such that the inner surface of each of the sectionally circular wall portions 3 slightly projects toward the inside more than the inner surface of the center portion of the flat side 2a in each of the sectionally rectangular wall portions 2. The whole of this protector P is integrally formed of synthetic resin material or rubber material. Although the corrugated shape of the pipe wall 1 according to the present invention is shown as a bellows-like corrugated shape, it is not limited to this, but may be carried out as a spirally corrugated shape.

As means for manufacturing the protector P having such a structure, any known means may be used. For example, melted resin is extruded in the form of a tube from a resin extruder arranged on one end of a travelling mold cavity for molding a pipe in a well-known travelling mold system. Pressurized air is blown into the tube, or the air is sucked from the mold simultaneously to thereby mold the melted tube sequentially and continuously while pressing the tube onto the mold.

Since the sectionally rectangular wall portions 2 of the pipe wall 1 are formed to be rectangular, the protector P with such a structure can be subjected to piping stably in any place, positioning is easy, piping can be performed without being out of position or twisted after the protector is subjected to piping, and a wire harness (not shown) may be inserted into the protector P if the portion of the cutting line 4 is merely opened to insert the wire harness inside in the same manner as in a conventional protector P. The wire harness inserted into the protector P is supported by the sectionally circular wall portions 3 projecting toward the inner circumferential side in the inner surface of the protector P, and even if dew or the like is produced in the pipe, or even if water drops or the like come into the pipe in some situation, those water drops or the like are collected in the sectionally rectangular wall portions 2, so that the wire harness can be protected.

Figure 5:
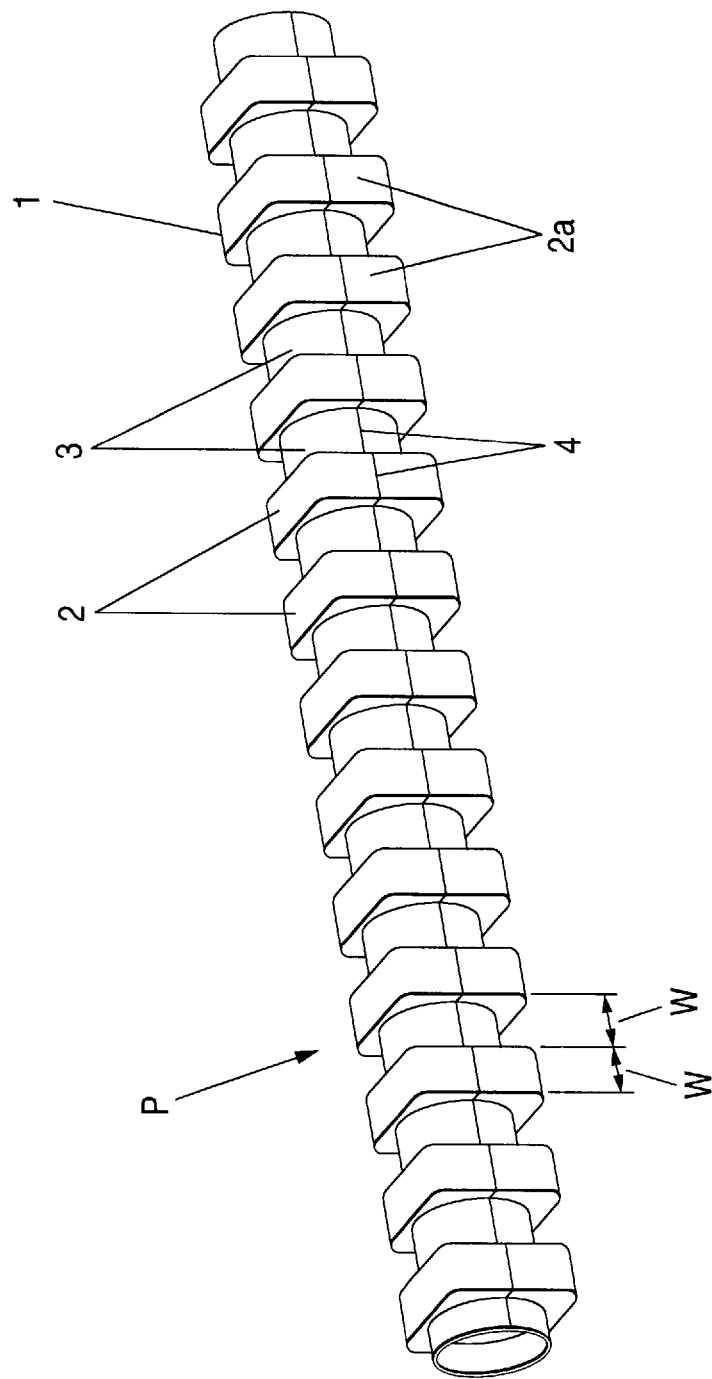
FIG. 5 is a perspective view showing a protector of a second embodiment.
Figure 6:
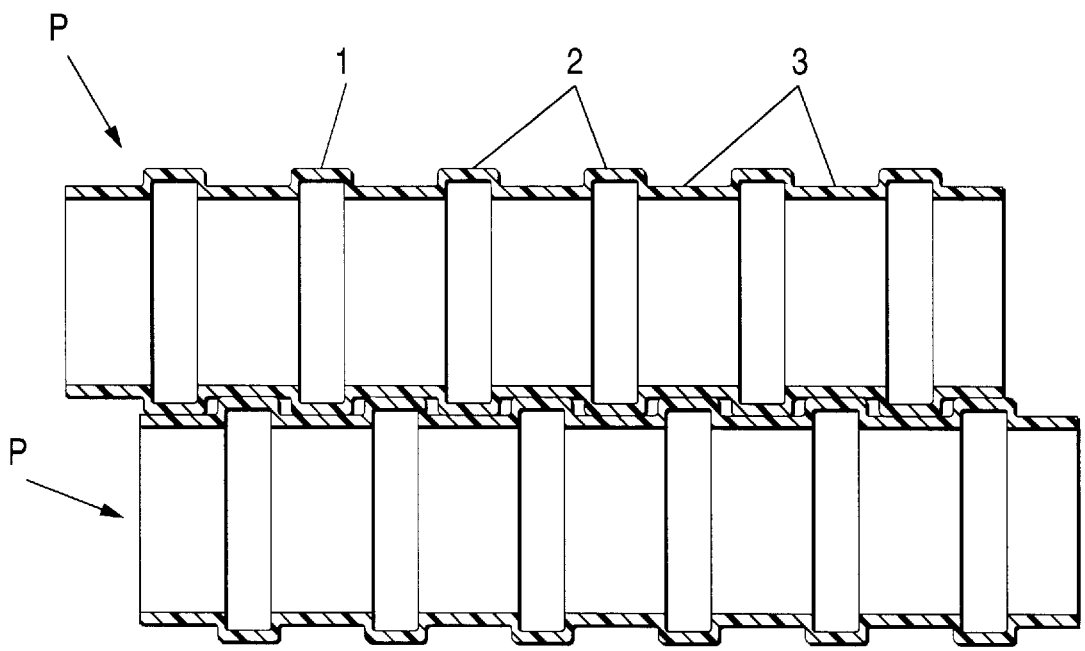
FIG. 6 is a cross-sectional view of two protectors of the second embodiment arranged in parallel with each other along their longitudinal direction.

FIGS. 5 and 6 show a second embodiment of a protector P. In this embodiment, the protector P has a structure in which, in the outer circumferential surface of the pipe wall 1, the sectionally circular wall portions 3 is formed to sink toward the inner circumferential side more than the center portions of the flat sides 2a of the sectionally rectangular wall portions 2, that is, to have a small-diameter, and the width "W" of each of the sectionally circular wall portions 3 in its axial direction is made to be a little wider than the width "w" of each of the sectionally rectangular wall portions 2 in its axial direction.

When two or more protectors P having such a configuration are subjected to piping in parallel with each other, those protectors P are disposed such that the sectionally circular wall portions 3 of one of the protectors P and the sectionally rectangular wall portions 2 of the other protector P are fitted to each other respectively as shown in FIG. 6, so that the protectors P can be subjected to piping more stably.

Figure 7:
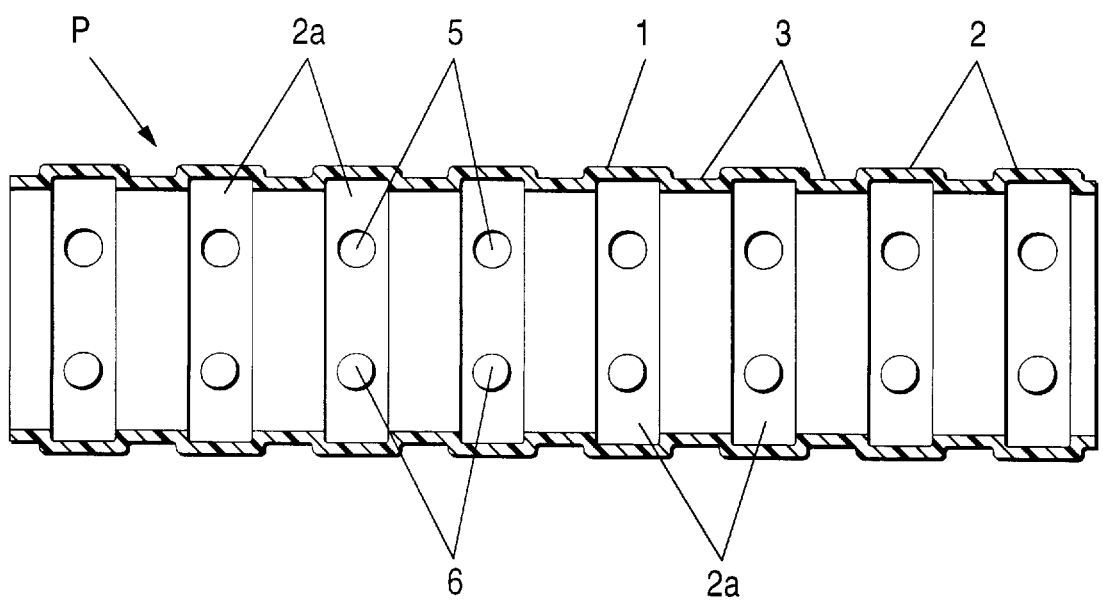
FIG. 7 is a vertical sectional view showing a protector of a third embodiment along its longitudinal direction.
Figure 8:
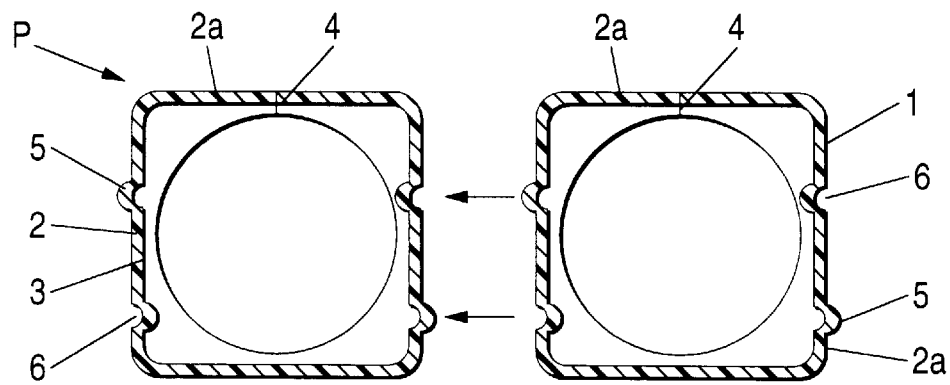
FIG. 8 is a vertical sectional view of a sectionally rectangular wall portion of the protector of the third embodiment.

FIGS. 7 and 8 show a protector P of a third embodiment suitable for parallel piping, which has a structure in which protrusions 5 . . . of desired size and recesses 6 . . . fitted to these protrusions 5 are formed on the upper and lower sides of the wall surfaces of two flat sides 2a and 2a (opposite two sides in this embodiment) of any sectionally rectangular wall portion 2 in the protector P shown in the first embodiment. Alternatively, the surfaces where these protrusions 5 . . . and the recesses 6 . . . are formed may be a combination of a vertical wall and an upper or lower surface in FIG. 8. Alternatively, it is possible to form those protrusions and recesses on every side, or it is also possible to form only two or more protrusions 5 in one side and only recesses 6 in other sides correspondingly to those protrusions. That is, as shown in FIG. 8, it goes well if the protrusions 5 and the recesses 6 are formed in the positions fitted to each other when the protectors P are disposed in close contact with each other. In addition, it is not necessary to form these protrusions 5 and recesses 6 in all the sectionally rectangular wall portions 2, but the present invention can be carried out also in the case where they are formed in every second or third of the sectionally rectangular wall portions 2.

Figure 9:
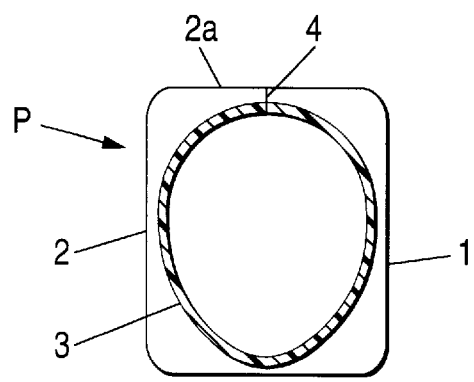
FIG. 9 is a vertical sectional view of a sectionally circular wall portion of a protector of a fourth embodiment.
Figure 10:
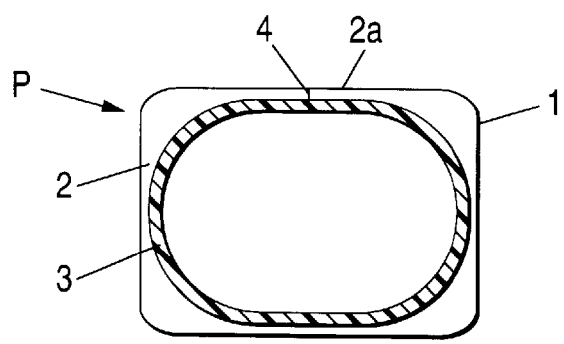
FIG. 10 is a vertical sectional view of a sectionally circular wall portion of a protector of a fifth embodiment.

Fourth and fifth embodiments shown in FIGS. 9 and 10 show cases where the sectional shapes of the protectors P are varied. In FIG. 9, the sectional shape of the sectionally rectangular wall portion 2 is made to be a rectangle which is long vertically, while the sectional shape of the sectionally circular wall portion 3 is made to be a vertically long ellipse the lower side of which is thin. In FIG. 10, the sectional shape of the sectionally rectangular wall portion 2 is made to be a rectangular which is long horizontally while the sectional shape of the sectionally circular wall portion 3 is made to be an ellipse. In addition, the cutting line 4 is formed to pass an upper flat side 2a. In such a manner, the present invention can be modified and carried out suitably in accordance with the quantity of wire harness to be inserted and protected, the place where the protector P is subjected to piping, and so on.

Although typical embodiments of the present invention have been described above, the invention is not always limited to the structure of the pipe according to these embodiments, and it can be modified and carried out by suitably changing the structure of the pipe within a scope having the above-mentioned constituents of the present invention, attaining the above-mentioned objects of the present invention, and having the following effects.

As is apparent from the above explanation, according to the present invention, a protector for protecting a wire harness is formed into a corrugated shape, this corrugated shape is constituted by sectionally rectangular portions and sectionally circular portions disposed alternately, and a cutting line for inserting a wire harness is formed to pass substantially center portions of the sectionally rectangular portions. Accordingly, there are advantages that the protector can be subjected to piping stably on the wall or floor in any place where the protector is to be subjected to piping, and positioning of the protector can be made easily. This protector according to the present invention is advantageously shaped to prevent the pipe from undesirable shifting.

In addition, when a desired number of protectors are to be disposed in parallel, this feature helps to maintain the parallel, bundled configuration of them and minimize disturbance of the linear and parallel alignment of the lines. In addition, there are advantages from the point of manufacture that the pipe can be manufactured efficiently at a high speed, and the pipe can be manufactured easily without increasing the cost.

What is claimed is:

1. A protector for a wire harness, comprising:

a pipe wall including sectionally rectangular wall portions and sectionally circular wall portions, said sectionally rectangular wall portions and said sectionally circular wall portions being disposed alternately in a longitudinal direction of said pipe wall; and a cutting line passing substantially centers of flat sides of said sectionally rectangular wall portions and passing at least a portion of said sectionally circular wall portions, said cutting line being used for insertion of the wire harness and being disposed over the entire length of said pipe wall, the whole of said pipe wall being made of a material selected from the group consisting of synthetic resin and rubber.

2. A protector for a wire harness as claimed in claim 1, wherein in an inner circumferential surface of said pipe wall, said sectionally circular wall portions project toward an inside more than center portions of said flat sides of said sectionally rectangular wall portions.

3. A protector for a wire harness as claimed in claim 1, wherein in an inner circumferential surface of said pipe wall, center portions of said flat sides of said sectionally rectangular wall portions and said sectionally circular wall portions are substantially even in surface to each other.

4. A protector for a wire harness as claimed in claim 1, wherein:
   in an outer circumferential surface of said pipe wall, said sectionally circular wall portions sink toward an inside more than center portions of said flat sides of said sectionally rectangular wall portions, and
   a width of each of said sectionally rectangular wall portions in the longitudinal direction is substantially no more than a width of each of said sectionally circular wall portions in the longitudinal direction.

5. A protector for a wire harness as claimed in claim 1, wherein one of said flat sides of said sectionally rectangular wall portions includes a protrusion and one of said flat sides of said sectionally rectangular wall portions includes a recess.

6. A protector for a wire harness, comprising:
   a pipe wall including sectionally first-shaped wall portions and sectionally second-shaped wall portions, said sectionally first-shaped wall portions and said sectionally second-shaped wall portions being disposed alternately in a predetermined direction of said pipe wall; and
   a cutting line passing substantially centers of sides of said sectionally first-shaped wall portions and passing at least a portion of said sectionally second-shaped wall portions, said cutting line being used for insertion of the wire harness and being disposed over a length of said pipe wall.

7. A protector according to claim 6, wherein said cutting line passes at least a portion of said sectionally circular wall portions.

8. A protector according to claim 6, wherein:
   said sectionally first-shaped wall portions comprise sectionally rectangular wall portions, and
   said sectionally second-shaped wall portions comprise sectionally circular wall portions.

9. A protector according to claim 6, wherein said predetermined direction of said pipe wall comprises a longitudinal direction of said pipe wall.

10. A protector according to claim 6, wherein said cutting line passes substantially centers of flat sides of said sectionally first-shaped wall portions and at least a portion of said second-shaped wall portions.

11. A protector according to claim 6, wherein said cutting line is disposed over an entire length of said pipe wall.

12. A protector according to claim 6, wherein said pipe wall comprises synthetic resin.

13. A protector according to claim 6, wherein said pipe wall comprises rubber.

14. A protector according to claim 6, wherein, in an inner circumferential surface of said pipe wall, said sectionally second-shaped wall portions project interiorly more than center portions of said sides of said sectionally first-shaped wall portions.

15. A protector according to claim 6, wherein, in an inner circumferential surface of said pipe wall, center portions of said sides of said sectionally first-shaped wall portions and said sectionally second-shaped wall portions are substantially even in surface to each other.

16. A protector according to claim 6, wherein, in an outer circumferential surface of said pipe wall, said sectionally second-shaped wall portions sink interiorly more than center portions of said sides of said sectionally first-shaped wall portions.

17. A protector according to claim 16, wherein a width of each of said sectionally first-shaped wall portions in the predetermined direction is substantially no more than a width of each of said sectionally second-shaped wall portions in the predetermined direction.

18. A protector according to claim 6, wherein one of said sides of said sectionally first-shaped wall portions includes a protrusion.

19. A protector according to claim 18, wherein one of said sides of said sectionally first-shaped wall portions includes a recess.

* * * * *

REEXAMINATION CERTIFICATE (4204th)

United States Patent [19]
Amatsutsu et al.

[11] B1 5,832,960
[45] Certificate Issued Nov. 14, 2000

[54] WIRE HARNESS PROTECTOR

[75] Inventors: Hiroyuki Amatsutsu; Yasuhiro Kikumori, both of Osaka, Japan

[73] Assignee: Totaku Industries, Inc., Takatsuki, Japan

Reexamination Request:
No. 90/005,492, Sep. 10, 1999

Reexamination Certificate for:
Patent No.: 5,832,960
Issued: Nov. 10, 1998
Appl. No.: 08/838,537
Filed: Apr. 9, 1997

[30] Foreign Application Priority Data

Apr. 10, 1996 [JP] Japan .................................... 8-114171

[51] Int. Cl.⁷ ..................................................... F16L 11/00
[52] U.S. Cl. ........................ 138/110; 138/128; 138/156; 138/155; 138/121

[58] Field of Search .................................. 138/110, 128, 138/156, 155, 121

[56] References Cited

U.S. PATENT DOCUMENTS 5,799,703  9/1998  Kanao et al. ............................ 138/121
5,839,477  11/1998  Murayama .............................. 138/121

*Primary Examiner*—Patrick F Brinson

[57] ABSTRACT

In a wire harness protector, a pipe wall has a structure in which wall portions rectangular in section and wall portions circular in section are disposed alternately in the longitudinal direction, a cutting line used for insertion of the wire harness and passing substantially centers of flat sides of the sectionally rectangular wall portions is formed over the entire length of the pipe wall, and the whole of pipe wall is formed of synthetic resin or rubber.

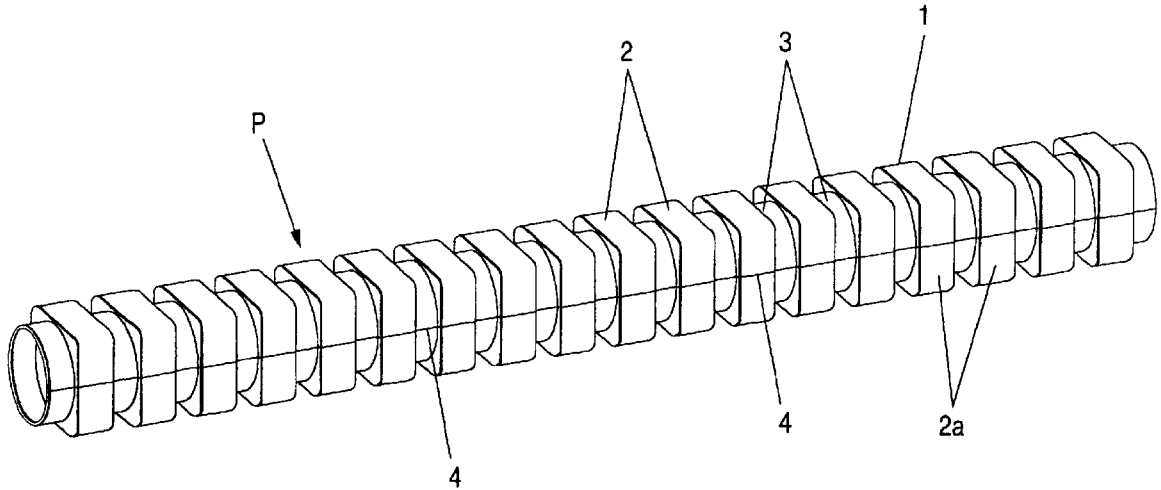

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *